United States Patent [19]
Harris

[11] 3,781,151
[45] Dec. 25, 1973

[54] APPARATUS FOR AGGLOMERATING PARTICULATE MATERIAL

[75] Inventor: LeRoy S. Harris, Rolling Meadows, Ill.

[73] Assignee: K-G Industries, Inc., Rosemont, Ill.

[22] Filed: Feb. 7, 1972

[21] Appl. No.: 224,196

[52] U.S. Cl............... 425/145, 425/237, 425/208, 425/222, 425/363, 222/241, 222/240, 222/412, 425/332, 425/367
[51] Int. Cl...................... B29c 15/00, B30b 11/18
[58] Field of Search.............. 425/222, 363–368, 425/374, 145, 135, 208, 409, 332, 333; 222/412, 413, 240, 241; 198/213

[56] References Cited
UNITED STATES PATENTS

| | | | |
|---|---|---|---|
| 2,977,631 | 4/1961 | Komarek et al. | 425/367 X |
| 3,597,794 | 8/1971 | Mann | 425/145 X |
| 2,018,784 | 10/1935 | Hall | 222/413 |
| 3,255,285 | 6/1966 | Chilson | 425/367 X |
| 3,445,888 | 5/1969 | Woitgel | 425/367 |
| 3,561,050 | 2/1971 | Danforth | 425/367 X |
| 3,674,397 | 7/1972 | Harris | 425/145 |
| 822,101 | 5/1906 | Copleston | 425/376 |
| 887,720 | 5/1908 | Campbell | 425/376 |
| 3,320,905 | 5/1967 | Urschel | 425/145 |
| 3,606,277 | 9/1971 | Kader | 425/376 X |
| 3,664,385 | 5/1972 | Carter | 222/413 X |
| 3,664,779 | 5/1972 | LaWarre | 425/376 X |
| 3,664,795 | 5/1972 | Heing et al. | 425/376 X |
| 3,645,505 | 2/1972 | McLeod | 222/413 X |

FOREIGN PATENTS OR APPLICATIONS

| 937,024 | 3/1948 | France | 222/241 |
|---|---|---|---|

Primary Examiner—J. Howard Flint, Jr.
Attorney—McDougall, Hersh & Scott

[57] ABSTRACT

An apparatus for processing particulate material wherein the material is fed between compacting rolls. The means for feeding the material comprise at least three feed screws aligned so that the material is fed along the length of the nip of the rolls. The drive means for the feed screws comprise a variable drive means for intermediate screws whereby the intermediate screw operation can be adjusted relative to the screws on the outside of the intermediate screws to provide control which achieves uniformity in the agglomerated product. The operation of the respective drive means may be automatically controlled by detecting means responsive to operating conditions.

21 Claims, 9 Drawing Figures

PATENTED DEC 25 1973

3,781,151

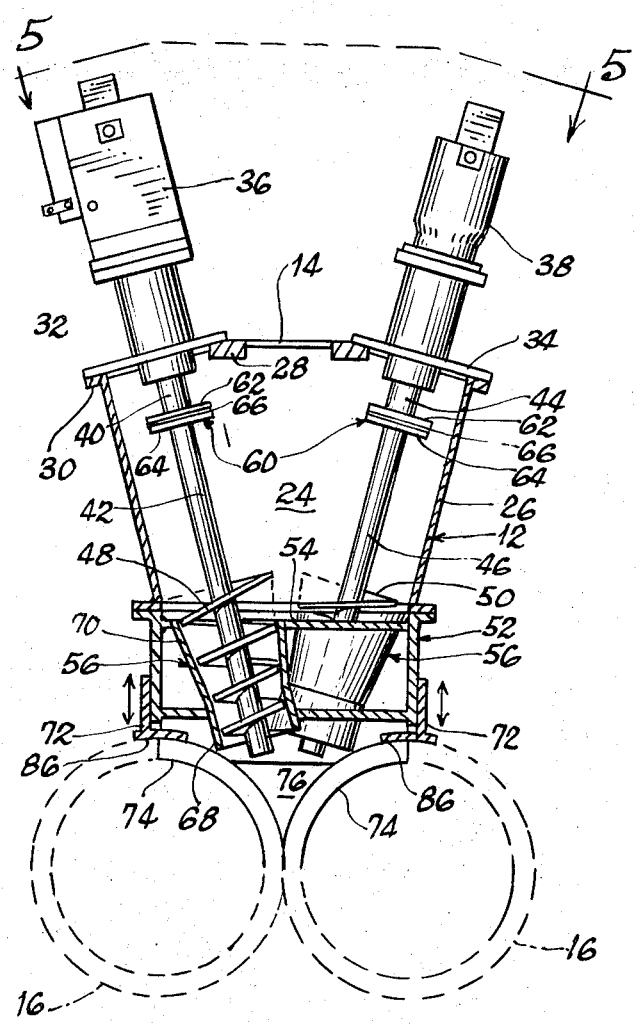
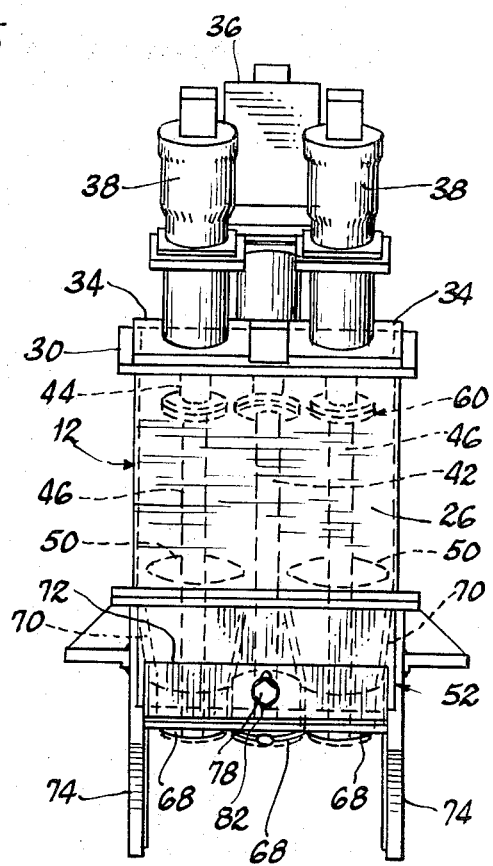
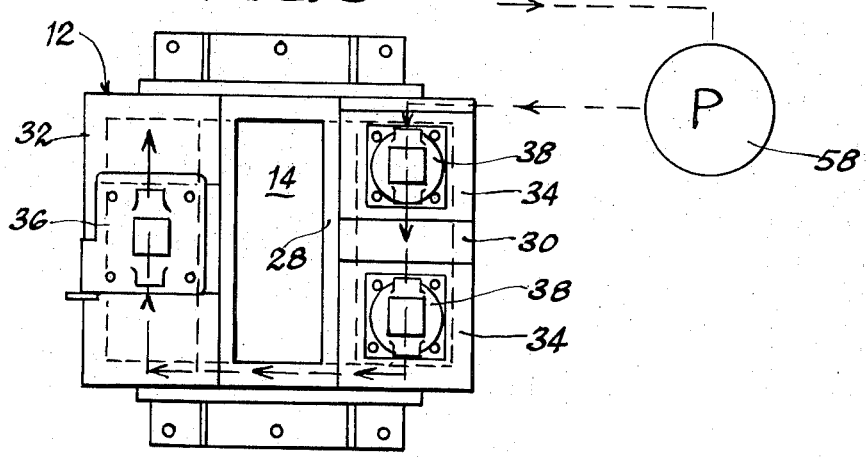

APPARATUS FOR AGGLOMERATING PARTICULATE MATERIAL

The invention is directed to apparatus for producing agglomerated particulate material. The invention is particularly concerned with constructions such as compacting and briquetting meachines wherein material is continuously fed between opposed rolls. These rolls define a particular configuration to produce agglomerated product of a certain character, and the rolls are driven to produce a continuous output of the agglomerated product.

In prior art constructions for agglomerating particulate material, it has been found desirable to employ screw feeding means. Specifically, the particulate material is located in a hopper, and screw feeding means are employed for delivering the material to the compacting rolls which are positioned adjacent a discharge opening of the hopper. The screw feeding means have been quite effective from the standpoint of providing continuous feeding of material to the compacting rolls, and the screw feeding means also serve to precompress the material as described in Komarek, et al. U.S. Pat. No. 2,977,631. The precompression of the material has been found to provide a more uniform and stronger agglomerated product.

It has been recognized, however, that the agglomerated output from relatively large equipment suffers from certain deficiencies. Thus, where long compacting rolls are employed, the resulting product will comprise a sheet or web of briquets of substantial width, the width being determined by the longitudinal extent of the nip of the compacting rolls. The product in such cases is often characterized by non-uniformity when comparing the agglomerated character of the product issuing from an intermediate area of the rolls with the product issuing from outside areas. In briquetting machines, for example the briquets formed in outer rows are often poorer and softer than the briquets of the middle rows where the briquetting rolls are designed to form a sheet having four or more rows of briquets.

Attempts have been made to develop uniform pressure all along the nip of compacting rolls to thereby provide uniformity in the resulting compacting product. Efforts in that direction have not, however, been entirely satisfactory.

It is a general object of this invention to provide an improved system for agglomerating particulate material whereby the agglomerated product will be uniform from the standpoint of strength and other characteristics even where relatively wide products are formed.

It is a more specific object of this invention to provide an improved apparatus which achieves feeding of particulate material to compacting rolls in a manner such that the output of the rolls will be substantially uniform along its entire width.

These and other objects of this invention will appear hereinafter and for purposes of illustration, but not of limitation, specific embodiments of the invention are shown in the accompanying drawings in which:

FIG. 3 is an enlarged fragmentary cross-sectional view illustrating the material feed construction of the apparatus;

FIG. 4 is an end elevational view of the construction illustrated in FIG. 3;

FIG. 5 is a plan view of the construction taken about the line 5—5 of FIG. 3;

Figure 1:
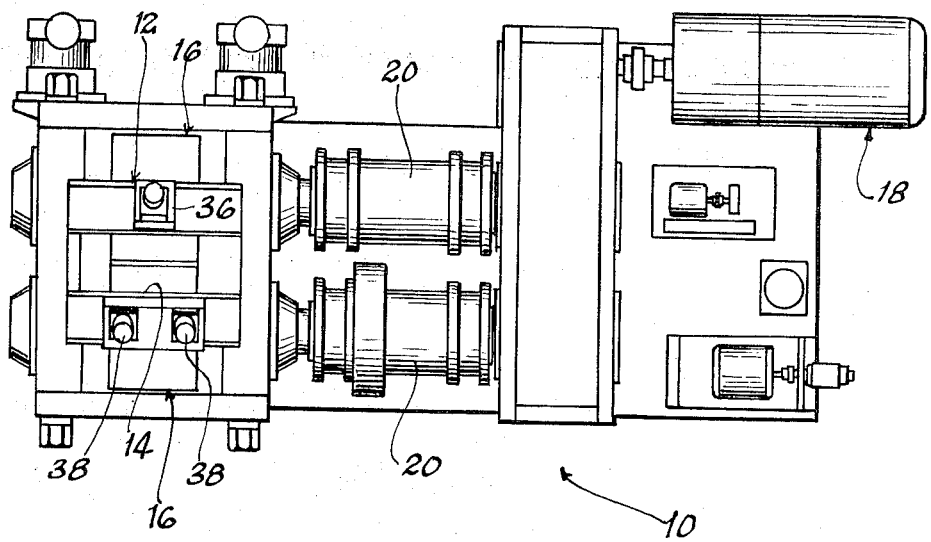
FIG. 1 is a plan view of a material compacting apparatus characterized by the features of this invention.

The apparatus of this invention generally comprises a feeding arrangement for delivering particulate material to compacting rolls. The feeding arrangement includes a receptacle having an inlet whereby the particulate material can be introduced into the receptacle. Feed screws are located in the receptacle, and in accordance with the various aspects of the invention, a minimum of two feed screws are employed.

The feed screws are situated in the receptacle so that the ends thereof are aligned longitudinally with respect to a discharge opening of the receptacle. This discharge opening extends longitudinally along the nip of the compacting rolls whereby each feed screw operates to deliver material to a specific location relative to the roll nip.

The feed screws are provided with drive means which control the feeding ability of the respective screws. In one aspect of the invention, at least three feed screws are employed, and a first drive means is employed for an intermediate screw or screws while separate drive means are employed for screws mounted on opposite sides of the intermediate screw. At least the intermediate drive means is provided with variable controls so that the relative speeds of the drive means can be changed. It has been found that employing different feeding rates along the length of the nip of the rolls will enable the production of a uniform product. Thus, variations in the feeding rate do not result in magnifying the non-uniformity experienced with prior systems but, on the contrary, these variations, if properly controlled, provide a means for eliminating the undesirable features of prior systems. The advantages of the invention are particularly apparent where large rolls are used for producing relatively wide output.

The concepts of the invention, particularly including the use of a plurality of feed screws for delivering material to the compacting rolls, provide other advantages. Thus, where two or more screws are employed, it is desirable to provide flexibility with respect to the positions of the screw axes. If the position of the axes can be related to the characteristics of the material being compacted, the particular type of compacting desired, and other variables, then a more efficient operation is possible. Such flexibility cannot be achieved with prior systems wherein a gear box having a double output shaft is employed for driving a pair of feed screws. Thus, the axes of the respective screws is fixed by the gear box design which eliminates the possibility of adjusting the positions of the axes without providing a new gear box for each desired change in condition.

When the use of hydraulic motors mounted on a suitable support, the desired flexibility can be achieved. Thus, the center distances of the screw can be readily shifted without in any way disrupting the drive system employed for operating the screws. Hydraulic or electric motors can be associated with the respective screws and shifted with the screws to provide optimum operating conditions. This type of arrangement can, of course, also be employed where more than two screws are utilized.

The accompanying drawings illustrate an agglomerating apparatus 10 which includes a hopper 12 having an inlet opening 14. A pair of compacting rolls 16 are positioned beneath the hopper whereby material discharged from the hopper will be fed between these rolls.

The apparatus includes a main drive motor 18 connected to the rolls 16 through drive couplings 20. The rolls illustrated are briquetting rolls defining pockets 22 whereby individual briquets having a shape determined by the shape of the pockets will be produced. In the embodiment illustrated, five rows of pockets are provided; however, it will be appreciated that the concepts of the invention apply to briquetting rolls of various sizes as well as to other types of compacting rolls.

As best shown in FIGS. 3 through 5, the hopper construction 12 defines a main material holding area 24 which is enclosed by walls 26. The inlet opening 14 is defined by the section 28 of a frame structure 30 which is supported by the walls 26.

A first plate 32 extends over the frame 30 on one side of the opening 14, and a pair of plates 34 are positioned on the other side of the opening. Hydraulic motor 36 is mounted on plate 32 while a pair of hydraulic motors 38 are mounted on the respective plates 34. Each of the plates defines openings whereby the drive shafts of the motors extend into the interior 24 of the hopper.

The drive shaft 40 of the motor 36 is coupled to a screw supporting shaft 42 while the drive shafts 44 of the motors 38 are coupled to screw supporting shafts 46. Feed screws 48 and 50 are secured, respectively, to the shafts 42 and 46. The walls 26 of the hopper are mounted on a lower housing 52 which includes a transversely extending wall 54. This wall defines an opening for each of the feed screws with tubular structures 56 being provided for the respective screws. The wall 54 thus serves to isolate the lower housing except with respect to the interiors of the tubular structures 56.

As best shown in FIGS. 3 and 4, the shafts of the hydraulic motors are angularly disposed and are aligned longitudinally along the length of the hopper. Accordingly, the ends of the screws are positioned relative to a particular area along the nip of the rolls 16. In the embodiment illustrated, the screws 50 are located in outside positions while the screw 58 is located in an intermediate position. The discharge ends of the tubular members 56 encompass virtually the entire length of the nip of the compacting rolls.

In the illustrated apparatus, the motor 36 comprises a variable displacement hydraulic motor while the motors 38 are fixed displacement hydraulic motors. These motors are connected in series as shown in FIG. 5 to pump 58. With this arrangement, the operating characteristics of the motors 38 will be the same, with variations depending only upon the operation of the pump 58. The motor 36, on the other hand, will vary in operation depending upon the displacement setting and also upon the operation of pump 58. The pump 58 is preferably a variable displacement pump so that variations in the operating characteristics of the three motors can be controlled.

In a typical operation of a construction as illustrated in the drawings, particulate material is introduced through the opening 14 of the hopper 12 by any suitable continuous feeding apparatus. The hydraulic motors 36 and 38 operate to remove the material in a continuous fashion from the main hopper area 24. This material passes through the respective tubular passages 56 for delivery to the nip of the compacting rolls. The continuous rotation of the rolls will then result in a sheet of briquets comprising the agglomerated material.

The character of the briquets in the initial stages of production is observed, and suitable variations in the feeding of compacted material can be made when the output is characterized by poor properties or non-uniformity. If, for example, the material is uniformly soft or otherwise of poor quality, then the operation of pump 58 can be varied to uniformly change the operation of the three feed screws. A more rapid feeding rate with a corresponding change in the degree of precompression of the particulate material may, for instance, lead to elimination of the undesirable softness in the briquetted products.

Where non-uniform product characteristics are recognized, then the ability to control the variable displacement motor 36 becomes important. Thus, the displacement can be changed whereby the feeding rate, precompression, etc., of the material at the center of the compacting rolls will be varied relative to the conditions at the outside areas of the rolls. It has been found that the ability to make such changes will in virtually all instances greatly improve the uniformity of the agglomerated product.

In the embodiment illustrated, the variations between intermediate and outside feed screws is accomplished by means of the intermediate variable displacement hydraulic motor 36 and fixed motors 38, each of the motors being connected in series to a single variable displacement pump. In most instances, a decrease in the operating speed of the center screw is called for to achieve uniformity in the feed rate and predensification of the particulate material. Once the amount of decreased displacement has been determined, the displacement can then be locked with the speed of the intermediate screw then being held in fixed proportion to the speed of the outer screws. The method for determining the degree of variation may take several forms including a trial and error procedure which would be followed in the early stages of a product run. On the other hand, the concepts described in applicant's application Ser. No. 95,456, filed on Dec. 7, 1970, now U.S. Pat. No. 3,674,397, may be followed. Specifically, a detecting means may be employed for detecting variations in the pressure exerted by the rolls on the material between the rolls. The measure of these variations can then be used for controlling the variable displacements of the structures described.

Figure 2:
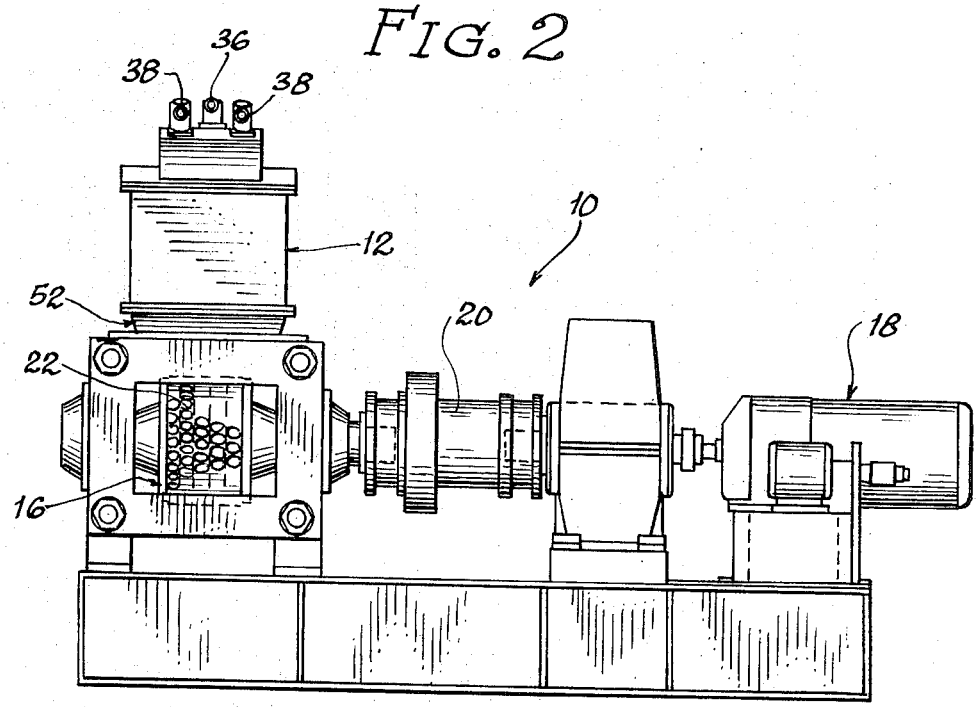
FIG. 2 is an elevational view of the apparatus illustrated in FIG. 1.

Referring specifically to the aforementioned application, the pump 58 shown in FIG. 5 herein may be a variable displacement model. The controls and lines shown in FIGS. 2, 3 and 4 of the aforementioned application may be connected to the pump 58 in the same manner as the connections are made to the pump 32 in those figures. With respect to FIG. 5 of the aforementioned application, a control valve may be inserted if the pump 58 is a fixed displacement model.

Instead of a variable displacement motor 36, a fixed displacement motor could be employed. In that case, a by-pass line with a control valve may be located in parallel with the motor with the setting of the valve being adjusted depending upon the changes in screw speed and densifying pressure desired. This arrangement will accomplish the same end as the variable displacement motor 36.

The pump 58 in FIG. 5 is connected in series with the motors 36 and 38. It will be appreciated, however, that a parallel connection of the motors is also feasible since variable control of the motor 36 can still be accomplished. With a parallel arrangement, separate hydraulic pumps could be employed for each motor. In the parallel arrangements described, the controller arrangements set forth in the aforementioned application could still be employed.

The use of electric motors in place of the hydraulic motors is also contemplated. Individual electric motors for the respective feed screws could be controlled from a single variable speed control circuit. Such circuits permit the relative speed of individual SCR-type DC motors to be tuned or adjusted with respect to each other whereby the screw speed and pre-densifying variations can be accomplished as previously discussed.

The particular feed screw mounting arrangement illustrated in FIGS. 3 and 4 also provides advantages in an agglomerating apparatus. The screw shafts 42 and 46 are coupled to the motor drive shafts 40 and 44 by means of coupling arrangements 60. These coupling arrangements include a pair of plates 62 and 64 separated by means of one or more shims or spacers 66. The hopper 12 is mounted on a support which is fixed relative to the axes of the compacting rolls 16 and, accordingly, the coupling arrangement serves to locate the screws in position relative to the roll nip. Thus, if several spacers 66, or thick spacers are used, the screw ends will be located close to the compacting rolls. On the other hand, these screw ends may be located farther away by removing spacers.

The design of the tubular members 56 which confine the screw bodies is provided to cooperate with the coupling arrangement 60. It will be noted that the tubular members include a straight lower section 68 and an upper section 70 which may be upwardly tapered as shown or otherwise enlarged, for example, curved, hyperbolic, parabolic, or multiple tapered. The screws 48 and 50 are provided with a straight section confined within the portion 68 and an outwardly tapering section confined within the portion 70 of the tubular member. With this arrangement, the insertion or removal of shims 66 will vary the position of the screw within the tubular member 56; however, this will not affect the screw clearance in the lower portion 68. The clearance in the tapered portion will, however, be affected, and this provides a means for controlling pre-compression or pre-densifying of the particulate material. If the tapered screw section is raised, the compressing ability of the screw will be decreased.

The ability to change the compression ratio of the screws in quite important since various materials and briquetting conditions dictate an optimum screw compression ratio. The adjustable arrangement described results in greater or lesser "leak-back" of material during a compacting operation with a constant variable in the compression ratio. When the compression ratio is at an optimum point, the over-all operation becomes more efficient from the standpoint of screw operation and from the standpoint of the horsepower requirements for the feeder drive. A more desirable product can be produced with a decrease in operating power requirements.

In addition, the changing clearance between the tapered screw section and the tubular member will permit greater or less leaking of air, gas or fines out of the tubular members. Where a great deal of entrained air, gas or fines are present in a batch of particulate material, it is desirable to increase the clearance between the screw and surrounding tubular member whereby greater amounts of such materials will be free to pass upwardly during pre-densification of the particulate material. This arrangement is quite important when compared with the possibility of air or other gas being passed through the compacting rolls since any gas trapped within a briquet or other agglomerated product will tend to weaken the product. Briquets, for example, will be much more susceptible to fracture if there is any significant amount of entrapped gas within the briquet body.

Figure 7:
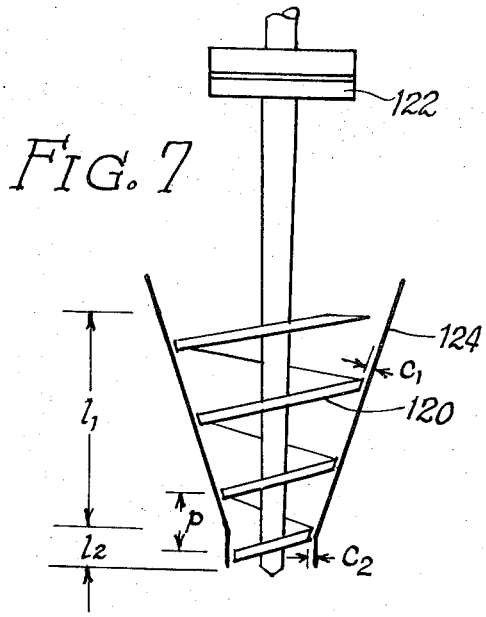
Figure 8:
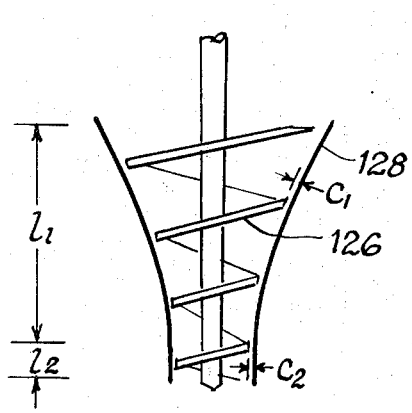
Figure 9:
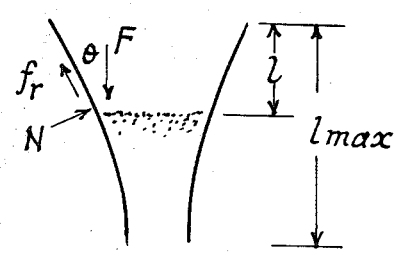

FIGS. 7, 8 and 9 provide schematic illustrations which better illustrate the relationship between the feed screw and the material in accordance with the concepts of this invention. Thus, it has been found that the compression ratio, which comprises the ratio of driving force to resisting force, can be controlled to provide optimum operating conditions where specific designs are provided for feed screws and screw housings.

In FIG. 7, the feed screw 120 includes a tapered upper section which extends for the distaince $l_1$. A short straight section of the feed screw extends for the distance $l_2$ with that distance being equal to or less than the pitch p of the feed screw. Through the use of shims 122, the clearance $c_1$ between the periphery of the feed screw and the housing wall 124 can be varied in the area of the tapered screw portion. This variation is achieved without any change in the clearance $c_2$ in the straight section area.

It has been found that an increase in $c_1$ has the affect of decreasing the effective compression ratio and viceversa. The optimum compression ratio varies with different materials, and the ability to achieve variations in a particular machine, therefore, makes the machine more versatile and more efficient. The decrease in the compression ratio which is achieved by an increase in $c_1$ is believed to be due to the fact that back flow or leaking of material will occur. The adjustment of $c_1$ also allows for variation in the amount of air which can be forceably removed from the material.

In FIG. 8, the feed screw 126 and the housing 128 have a hyperbolic configuration. A section $c_1$ of variable spacing and a straight section $c_2$ of substantially constant spacing is also provided with this arrangement. It has been found, however, that in addition to providing adjustment of $c_1$ to achieve the results described above, the hyperbolic design results in decreased frictional reaction of material against the housing wall. The decreased frictional reaction provides a more efficient feeding of material since the driving force required for producing a given production rate will be decreased when compared with other designs.

FIG. 9 will serve to illustrate the conditions which are believed to exist during operation of the hyperbolic feed screw arrangement shown. Considering the symbols in the drawings, the following relationships occur:

$F_v$ = compressive force (vertical component) of material against feeder base wall due to screw. F increases as material is pushed, forced or fed through screw.

$F_v = (f)1$ $F_{v_r}$ = frictional force of material against feeder base wall, due to vertical force component $F_{v_r} = uF_v \sin \phi$   $u$ = coefficient of friction $\phi = (f)(1_{max} - 1)$  $\phi$ decreases as 1 increases   (1)

$F_{v_r} = uF_v \sin[(f)(1_{max} - 1)]$   (2)

From equations (1) and (2), it is seen that as 1 increases sin $\phi$ decreases and reaches zero, thus causing the frictional force due to the vertical force component, against the housing wall to decrease to zero.

Referring to FIGS. 3 and 4, the illustrated apparatus also includes adjustable walls 72 located on either side of the lower housing 52. These adjustable walls comprise seal plates which cooperate with cheek plates 74 to prevent any significant passage of material except between the compacting rolls. Thus, these plates enclose the area 76 located just above the roll nip.

The seal plates 72 are connected to the lower housing 52 by means of bolts 78 which are received in a slot 80 defined by the plates 72. It will be appreciated that the plates 72 can be raised or lowered to increase or decrease the gap between shoe sections 86 of the plates, and the briquetting roll surfaces. These seal plates 72 also function as means for controlling the release of entrained gas from within the particulate material being fed to the compacting rolls. Thus, if any significant amount of gas tends to enter the area 76, then the seal plates 86 can be raised to provide for removal of gas as this gas is forced out of the material during the compacting operation.

Figure 6:
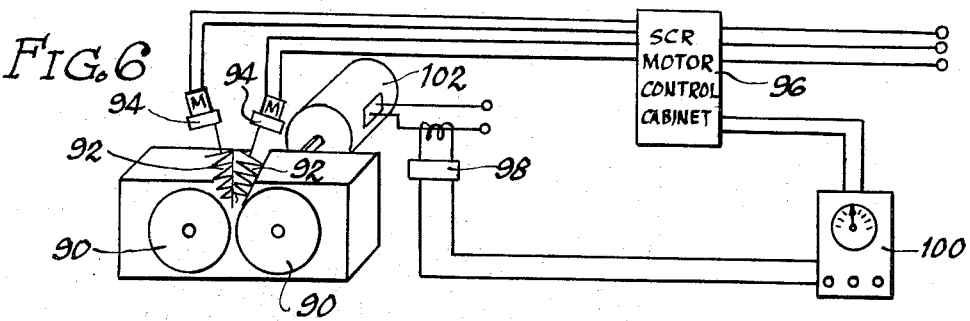
FIG. 6 is a schematic illustration of circuitry suitable for use with constructions incorporating the features of this invention; and, FIGS. 7 through 9 are schematic illustrations which show the operating relationship of feed screws employed in accordance with the concepts of the invention.

FIG. 6 provides a schematic illustration of a construction incorporating the features of the invention and employing an electrical system. The construction includes briquetting rolls 90 and feed screws 92. Direct current SCR electric motors or drives with electrical eddy current clutches, or variable frequency motors, located at 94, are employed for driving the feed screws.

The drives 94 are controlled through cabinet 96 which is connected to signal transducer 98 through a transducer, transducer follower or similar device used in SCR control circuits, for example as manufactured by Louis-Allis or Seco. This device 100 may be any suitable mechanism for operating as described in the aforementioned application whereby a signal will be transmitted to the motor control 96 in accordance with variations detected in the operation of roll drive motor 102. Thus, if the conditions of operation vary such that a greater or lesser demand is made on the motor 102, this will be detected by the signal transducer with a differential signal then being applied to the motor control 96 for thereby affecting the operation of the motors 94.

Roll gap detectors and other means for producing a differential signal may be employed, and reference is made to the aforementioned application for the particulars concerning applications of this nature. It will be appreciated, however, that the concepts of this invention are applicable to such systems as well as to other systems employing hydraulic or electrical drive means in multiple screw applications.

It will be understood that various changes and modifications may be made in the above described construction which provide the characteristics of the invention without departing from the spirit thereof particularly as defined in the following claims.

That which is claimed is:

1. In an apparatus for processing particulate material wherein the material is located in a feeding receptacle and is fed from the receptacle between compacting rolls and thereby agglomerated, the improvement comprising means for feeding the particulate material comprising at least three feed screws located within said receptacle, said feed screws extending to a position adjacent the nip of said rolls and said feed screws being aligned longitudinally of the roll axes with a first feed screw located at one end of the respective rolls, a second feed screw located at the other end of the respective rolls, and another feed screw located intermediate the first and second feed screws whereby the feed screws directly affect the movement of all material between the rolls, means for driving the feed screws including a first drive means for at least the one screw positioned intermediate the other screws, and separate drive means for the other screws positioned on either side of said intermediate screw, and means for adjusting the relative speeds of the respective drive means whereby feeding of material between the rolls can be adjusted along the length of the rolls.

2. An apparatus in accordance with claim 1 wherein said separate drive means comprises a fixed displacement hydraulic motor and said first drive means comprises a variable displacement hydraulic motor, and including means for controlling the displacement of said variable displacement hydraulic motor.

3. An apparatus in accordance with claim 2 wherein said motors are connected in series to a common variable displacement hydraulic pump.

4. An apparatus in accordance with claim 1 wherein said drive means comprise electric motors, and including means for varying the speed of at least said first drive means relative to said separate drive means.

5. An apparatus in accordance with claim 1 including three feed screws, said first drive means comprising a single motor driving the center screw, said separate drive means comprising two additional motors each attached to one of the outer screws, and means for operating said additional motors at the same speed.

6. An apparatus in accordance with claim 1 including means for detecting variations in pressure exerted by said rolls on said material, and means for varying the operation of said screw drive means in proportion to said variations in pressure.

7. An apparatus in accordance with claim 1 wherein said screw drive means are all fixed displacement hydraulic motors, and including a by-pass line and control valve connected to the hydraulic motor comprising said first drive means for thereby varying the output of said first drive means relative to said separate drive means.

8. An apparatus in accordance with claim 1 wherein said receptacle comprises a hopper for holding said material and a housing attached to said hopper and located between the hopper and said rolls, and including individual passages defined by said housing for receiving said feed screws.

9. An apparatus in accordance with claim 8 including plates attached to said housing and extending between the housing and the periphery of said rolls, and means for adjusting the spacing between the edges of said plates and the roll surfaces to thereby control the passage of gas outwardly from within said housing whereby the passage of gas with said material between said rolls is minimized.

10. In an apparatus for processing particulate material wherein the material is located in a feeding receptacle and is fed from the receptacle between compacting rolls and thereby agglomerated, the improvement wherein said receptacle comprises a hopper for holding said material and a housing attached to said hopper and located between the hopper and said rolls, a plurality of feed screws in said housing, means for driving said feed screws, individual passages defined by said housing for receiving said feed screws, plates attached to said housing and extending between the housing and the periphery of said rolls, and means adjustably connecting said plates to said housing for changing the spacing between the edges of said plates and the roll surfaces to thereby control the passage of gas outwardly from within said housing whereby the passage of gas with said material between said rolls is minimized.

11. An apparatus in accordance with claim 10 including means for varying the position of said feed screws relative to said rolls.

12. An apparatus in accordance with claim 11 wherein said screws are mounted on a supporting shaft, said drive means for the feed screws comprising motors, drive shafts for said motors and supporting shafts for said screws, the connecting means for said shafts including removable spacer means with the addition or removal of spacer means determining the position of said screws relative to said rolls.

13. In an apparatus for processing particulate material wherein the material is located in a feeding receptacle, and including means for feeding the material from the receptacle between compacting rolls for thereby agglomerating the material, the means for feeding the particulate material comprising at least one feed screw located within said receptacle, said feed screw extending to a position adjacent the nip of said rolls, the improvement wherein said feed screw is mounted on a supporting shaft, drive means for said feed screw comprising a motor, a drive shaft for said motor, means connecting said drive shaft to said supporting shaft, said connecting means comprising adjustable coupling means for varying the effective length of the combined shafts for thereby varying the position of said screw relative to said rolls to thereby vary the effective compression ratio on said material.

14. An apparatus in accordance with claim 13 wherein said receptacle comprises a hopper for holding said material and a housing attached to said hopper and located between the hopper and said rolls, and including a passage defined by said housing for receiving said feed screw, said passage including a lower section and an enlarged upper section, said feed screw having a lower section received in the lower section of said passage whereby variation in the relative position of the lower section of said passage and screw will not significantly vary the spacing between the screw periphery and passage wall, said feed screw having an upper section received in the upper section of said passage, the respective upper sections being designed whereby variation in the relative positions of the upper sections of said passage and screw will vary the spacing between the screw periphery and passage wall.

15. An apparatus in accordance with claim 14 wherein the lower section of said passage and said screw each comprise a substantially straight section having a length equal to or less than the pitch of said feed screw, and wherein said upper section tapers outwardly relative to said lower section.

16. An apparatus in accordance with claim 14 wherein said passage and said screw each define a hyperbolic shape with the lower sections thereof being substantially straight and with the upper sections extending outwardly from said lower section.

17. An apparatus in accordance with claim 13 wherein said adjustable coupling means include removable spacers.

18. In an apparatus for processing particulate material wherein the material is located in a feeding receptacle and is fed from the receptacle between compacting rolls and thereby agglomerated, the improvement comprising means for feeding the particulate material comprising a plurality of feed screws located within said receptacle, said feed screws extending to a position adjacent the nip of said rolls and said feed screws being aligned longitudinally of the roll axes to thereby directly affect the movement of all material between the rolls, and means for driving the feed screws comprising separate motors for each screw, said motors being mounted whereby the distance between the axes of the respective screws can be adjusted longitudinally of the roll axes.

19. In an apparatus for processing particulate material wherein the material is located in a feeding receptacle and is fed from the receptacle between compacting rolls and thereby agglomerated, the means for feeding the particulate material comprising at least one feed screw located within said receptacle, the improvement wherein said feed screw defines a hyperbolic shape comprising a substantially straight lower section and an upper section tapering outwardly relative to the lower section, the lower section of the screw thus comprising a relatively narrow end portion adjacent the compacting rolls, and the upper section comprising a wider portion more remote from the compacting rolls.

20. An apparatus in accordance with claim 19 wherein said receptacle defines a screw receiving passage, said passage also defining a hyperbolic shape substantially corresponding to the shape of said screw.

21. An apparatus in accordance with claim 20 wherein said substantially straight sections of the screw and passage have a length equal to or less than the pitch of said feed screw.

* * * * *